United States Patent Office 2,962,490
Patented Nov. 29, 1960

2,962,490

PROCESS AND CATALYST FOR PRODUCTION OF OLEFIN POLYMERS

James T. Edmonds, Jr., Gene Nowlin, and Harold D. Lyons, Bartlesville, Okla., assignors to Phillips Petroleum Company, a corporation of Delaware No Drawing. Filed Aug. 22, 1955, Ser. No. 529,918

14 Claims. (Cl. 260—94.9)

This invention relates to the polymerization of olefins. In one aspect, this invention relates to an improved method for polymerizing olefins and to a novel catalyst therefor.

Reactions for polymerizing olefins are well known in the art and are generally carried out in the presence of catalysts. One class of catalysts which has been used in the polymerization of monoolefins, particularly ethylene, is organometal compounds, for example triethylaluminum, and the polymers which have been obtained in accordance with this method are generally liquid or low molecular weight solid polymers. Frequently, the polymers obtained are dimers or trimers of the olefin charged. However, it is often desirable to produce higher molecular weight polymers which have desirable properties of heat stability and can be molded into vessels, pipes and tubing. Such uses cannot be made of the lower molecular weight polymers, for example, a polymer having a molecular weight of about 1,000, since a polymer of this molecular weight is a wax-like material.

An object of this invention, therefore, is to provide an improved process for the production of olefin polymers.

A further object is to provide a novel catalyst for use in the production of olefin polymers.

A still further object is to produce high molecular weight solid polymers of olefins, such as ethylene.

Other and further objects and advantages of this invention will become apparent to those skilled in the art upon consideration of the accompanying disclosure.

It has now been discovered that an unexpected improvement in the production of high molecular weight polymer is obtained when an olefin, such as ethylene, is polymerized in the presence of a catalyst composition comprising at least one member of each of the following classes of materials: (A) a titanium derivative as defined hereinbelow; (B) a complex hydride of an alkali metal and a metal of Group III-B of the periodic table (Mendelieff's Periodic System), and (C) a halide of aluminum.

The titanium derivative used as a component of our catalyst composition is selected from the group consisting of (1) compounds corresponding to the formula $X_nTi(OR)_m$, (2) compounds corresponding to the formula $Ti_a[(OCH_2CH_2)_aNH_{(3-a)}]_b$, (3) salts of monobasic organic acids and titanium, and (4) complex salts of dibasic organic acids and titanium and at least one selected from the group consisting of alkali metals and ammonia, wherein X is a halogen, and R is selected from the group consisting of R'' and R'''. R'' is selected from the group consisting of saturated acyclic (alkyl), monoolefinic acyclic (alkenyl), saturated cyclic (cycloalkyl), monoolefinic cyclic (cycloalkenyl), aromatic (aryl), and combinations of two or more of these radicals. Examples of, but not exhaustive of, such combinations are alkaryl, aralkyl, alkarylalkyl, alkylcycloalkyl, arylalkenyl, cycloalkylalkenyl, cycloalkylalkyl, alkenylaryl, and alkenyl- cycloalkyl. R''' is selected from the group consisting of (a) R'' radicals which are halogen substituted, (b) R'' radicals which contain oxygen, and (c) R'' radicals which are halogen substituted and contain oxygen, said oxygen being present in the form of an ether linkage. Each R contains not more than 20 carbon atoms, preferably less than 10 carbon atoms, with the total carbon atoms in the compound not exceeding 50, m and n are whole numbers, with m being at least 1 and not greater than the valence of the titanium and with the sum of m and n being equal to the valence of the titanium, a is an integer from 1 to 3, inclusive, and b is equal to the valence of the titanium; X and the halogen contained in the R radical can be any of the halogens, including bromine, chlorine, fluorine and iodine.

Salts of monobasic organic acids and titanium which can be used include such compounds as titanium acetate, titanium butyrate, and the like. Complex salts of dibasic organic acids and titanium and at least one of the group consisting of alkali metals and ammonia can also be advantageously employed in our catalyst system. Examples of such compounds are sodium titanium malonate $(Na_2TiO(C_3H_2O_4)_2)$, potassium titanium oxalate (the complex salt of oxalic acid and titanium and potassium, $(K_2TiO(C_2O_4)_2)$, and the like. Of the latter group of compounds potassium titanium oxalate is the compound which is preferred for use in the catalyst system of our invention. Although numerous derivatives fall within the scope of the class of complex compounds corresponding to the formula $X_nTi(OR)_m$, the preferred derivatives include titanium butoxide (tetra-n-butyl titanate), tetra-sec-butyl titanate, tetraisopropyl titanate, tetra-2-ethylbutyl titanate, tetra-2-ethylhexyl titanate, tetrastearyl titanate, tetraethyl titanate, tetra(chloroethyl) titanate, tetra-m-tolyl titanate, tetraallyl titanate, tetracyclohexenyl titanate, tetracyclopentyl titanate, dichloro diethyl titanate $(Cl_2Ti(OC_2H_5)_2)$, and monochloro triethyl titanate $(ClTi(OC_2H_5)_3)$. Of the complex compounds listed in the above group, titanium butoxide $$(Ti(OC_4H_9)_4)$$

is preferred for use in our catalyst system. Examples of complex compounds corresponding to the formula $Ti_a[(OCH_2CH_2)_aNH_{(3-a)}]_b$  which can be employed in our catalyst system include monoethanolamine titanate, diethanolamine titanate, and triethanolamine titanate. Of this latter group of compounds, it is preferred to use triethanolamine titanate in the catalyst system of our invention.

The complex hydrides used as a component of our catalyst composition correspond to the formula $MM'H_x$, wherein M is an alkali metal, including sodium, potassium, lithium, rubidium and cesium, M' is a metal selected from the group consisting of aluminum, gallium, indium, and thallium, and x is equal to the sum of the valences of the two metals. Examples of such complex hydrides are lithium aluminum hydride, potassium aluminum hydride, sodium aluminum hydride, cesium aluminum hydride, sodium gallium hydride, lithium thallium hydride, lithium indium hydride, lithium gallium hydride, rubidium aluminum hydride, and the like. The preferred member of this class of compounds is lithium aluminum hydride.

The halides utilized as a component of our catalyst composition include the aluminum halides such as aluminum trichloride, aluminum tribromide, aluminum trifluoride, and aluminum triiodide. Of the members of this class of compounds, it is preferred to use aluminum trichloride.

The components of our catalyst system as described hereinabove are usually used in the anhydrous or substantially anhydrous condition. It is to be understood that mixtures of two or more members of each of the above described three classes of materials can be used in the practice of our invention.

The catalyst compositions falling within the scope of this disclosure which are preferred because their use to catalyze the polymerization of olefins provides relatively high molecular weight polymers and/or permits the use of relatively low reaction temperatures and pressures are the following: a mixture of titanium butoxide, lithium aluminum hydride and aluminum chloride; a mixture of titanium butoxide, lithium gallium hydride and aluminum chloride; a mixture of titanium butoxide, lithium aluminum hydride and aluminum bromide; a mixture of potassium titanium oxalate, lithium aluminum hydride and aluminum chloride; and a mixture of triethanolamine titanate, lithium aluminum hydride and aluminum chloride.

The amount of the catalyst composition of this invention which is used in the polymerization of olefins can vary over a wide range. Relatively small amounts of the catalyst provide the desired activating effect when the polymerization reaction is carried out as a batch process with continuous addition of the olefin as the polymerization reaction occurs. When a continuous flow system is employed, the concentration of the total catalyst composition is usually in the range from 0.01 weight percent to 1.0 weight percent, or higher.

The ratio of the amounts of complex hydride to titanium derivative will usually be in the range of 0.05 to 50, preferably 0.1 to 5, mols of hydride per mol of titanium derivative. The ratio of aluminum halide to titanium derivative will be in the range of 0.05 to 50, preferably 0.1 to 5, mols of aluminum halide per mol of titanium derivative.

The materials which are polymerized in accordance with this invention can be defined broadly as polymerizable hydrocarbons. Preferably, the polymerizable hydrocarbons are olefins containing a $CH_2=C<$ radical. The preferred class of polymerizable hydrocarbons used is aliphatic 1-olefins having up to and including 8 carbon atoms per molecule. Specifically, the normal 1-olefin, ethylene, has been found to polymerize to a polymer thereof upon being contacted with the catalyst composition of this invention at lower temperatures and pressures than have been used in the processes of the prior art mentioned above. Examples of other polymerizable hydrocarbons which can be used in the process of this invention are propylene, 1-butene, 1-hexene and 1-octene. Branched chain olefins can also be used, such as isobutylene. Also, 1,1-dialkyl-substituted and 1,2-dialkyl-substituted ethylenes can be used, such as butene-2, pentene-2, hexene-2, heptene-3, 2-methyl-butene-1, 2-methyl-hexene-1, 2-ethyl-heptene-1, and the like. Examples of the di- and polyolefins in which the double bond are in non-conjugated positions and which can be used in accordance with this invention are 1,5-hexadiene, 1,4-pentadiene and 1,4,7-octatriene. Cyclic olefins can also be used, such as cyclohexene. Mixtures of the foregoing polymerizable hydrocarbons can be polymerized to a solid polymer in the presence of our novel catalyt as, for example, by copolymerizing ethylene and propylene, ethylene and 1-butene, ethylene and 1-hexene, propylene and 1-butene, or propylene and a pentene. Also, aryl olefins, e.g., styrene and alkyl-substituted styrenes can be polymerized to a solid polymer in the process of this invetnion.

One of the important advantages obtained in the polymerization of olefins in the presence of our novel catalyst is that lower temperatures and pressures can be used than in certain of the prior art processes. The temperature can be varied over a rather broad range, however, such as from zero to 500° F. The preferred temperature range is from 100 to 350° F. Although pressures ranging from atmospheric up to 30,000 p.s.i.g. or higher can be employed, a pressure in the range of 100 to 1000 p.s.i.g. is usually preferred.

In this connection, it is noted that it is preferred to carry out the reaction in the presence of an inert, organic hydrocarbon diluent with a pressure sufficient to maintain the diluent in the liquid phase, giving rise to a so-called "mixed-phase" system. However, the polymerization process of this invention proceeds in the gaseous phase without a diluent. The preferred pressure range set forth above has been found to produce solid polymers of olefins in excellent yields.

Suitable diluents for use in the polymerization process are paraffins, cycloparaffins and/or aromatic hydrocarbons which are relatively inert, non-deleterious and liquid under the conditions of the process. The lower molecular weight alkanes, such as propane, butane, and pentane, are particularly useful when the process is carried out at low temperatures. However, the higher molecular weight paraffins and cycloparaffins, such as isooctane, cyclohexane and methylcyclohexane, and aromatic diluents, such as benzene, toluene, and the like can also be used, especially when operating at high temperatures. Halogenated hydrocarbons, such as halogenated aromatics, halogenated paraffins, halogenated cycloparaffins, etc. are also useful as diluents. Mixtures of any two or more of these diluents can also be used.

The process of this invention can be carried out as a batch process by pressuring the olefin into a reactor containing the catalyst and diluent, if the latter is used. Also, the process can be carried out continuously by maintaining the above-described concentrations of reactants in the reactor for a suitable residence time. The residence time used in a continuous process can vary widely, since it depends to a great extent upon the temperature at which the process is carried out. The residence time also varies with the specific olefin that is polymerized. However, the residence time for the polymerization of aliphatic monoolefins, within the preferred temperature range of 100 to 350° F., falls within the range of one second to an hour or more. In the batch process, the time for the reaction can vary widely also, such as up to 24 hours or more.

Various materials are known to be poisons for the catalyts composition of this invention. These materials include carbon dioxide, oxygen and water. Therefore, it is usually desirable to free the polymerizable hydrocarbon from these materials, as well as from other materials which tend to inactivate the catalyst before contacting the hydrocarbon with the catalyst. Any of the known means for removing such contaminants can be employed. When a diluent is used in the process, this material should be freed of contaminants, such as water, oxygen, and the like. It is desirable also that air and moisture be removed from the reaction vessel before the reaction is carried out.

At the completion of the polymerization reaction, when a batch process is used, the reactor is cooled to about room temperature, any excess olefin is vented, and the contents of the reactor, including the solid polymer swollen with diluent, is removed from the reactor. The total reactor effluent is then treated to inactivate the catalyst, as by washing with an alcohol. The alcohol-washing step is preferably carried out in a comminution zone, such as a Waring Blendor, so that a finely-divided polymer is thereby provided. The polymer is then separated from the alcohol and diluent by decantation or filtration after which the polymer is dried. When the process of the invention is carried out continuously, the total effluent from the reactor, including polymer, diluent and catalyst system is pumped from the reactor as a slurry to a catalyst-inactivating zone where the reactor effluent is cooled and contacted with a suitable catalyst-inactivating material, such as an alcohol. As in the batch process, it is desirable that the alcohol-treatment step be carried out in a comminution zone so that a finely divided polymer is thereby produced. The diluent and alcohol are then separated from the polymer, for example by filtration and the polymer is then dried. The diluent and alcohol can be separated, for example by fractional distillation, and reused in the process.

Example

Ethylene was polymerized in a 1200 cubic centimeter stainless steel rocking autoclave in the presence of a catalyst consisting of 1 gram of lithium aluminum hydride, 1 gram of anhydrous aluminum chloride and 1 gram of titanium butoxide. Prior to the addition of the catalyst components the reactor had been flushed with dry nitrogen to remove air and moisture. The diluent employed in this reaction was 400 milliliters of cyclohexane (distilled from sodium), which was charged just prior to the addition of the catalyst components. After the cyclohexane and catalyst components were charged the reactor was again flushed with dry nitrogen and with a small amount of purified ethylene to insure complete absence of air and moisture from the reactor. The ethylene which was used in this run was passed through a purification system to remove oxygen, carbon dioxide, and water vapor prior to entering the reactor. The purification system comprised a pyrogallol solution, a sodium hydroxide solution and drying agents.

With the reactor and contents at approximately 100° F., ethylene was added to the reactor until a pressure of about 200 p.s.i.g. was reached. Heating by means of an electrical heating jacket was then initiated and at the end of 1 hour and 45 minutes the temperature had increased to 170° F. and the pressure had increased to about 250 p.s.i.g. At the end of an additional 1 hour, the temperature had increased to about 210° F., and at this point heating was discontinued. After an additional 20-minute period, the temperature had increased to 220° F., and the pressure had decreased to about 225 p.s.i.g. Polymerization was obviously occurring, as indicated by the pressure drop in the reactor, and no further heating was required during the remainder of the run. During the subsequent 1 hour and 30 minutes, the reactor was repressured with ethylene as required to maintain the pressure above 200 p.s.i.g. The temperature varied during this period in the range of 220–230° F. At the end of this 1 hour and 30 minute period, the reactor was cooled with a water quench to approximately room temperature. Ethylene was vented from the reactor, and when the reactor was opened, a slurry of polymer in the cyclohexane was found to be present. About 400 milliliters of methyl alcohol were added to the reaction mixture, and the total was transferred to a Waring Blendor and ground for about 15 minutes. The solid polymer was filtered from the liquid and was then dried for about 8 hours at 80° C. under a vacuum of 29 inches of mercury. Approximately 32 grams of a finely divided white polymer of ethylene were recovered.

The lithium aluminum hydride was obtained from the Metal Hydrides Corporation, Beverly, Mass., the aluminum chloride was obtained from Merck and Company, Rahway, N.J., and the titanium butoxide (all 4 butyl groups are n-butyl) was obtained from E. I. du Pont de Nemours and Company, Wilmington, Delaware. The cyclohexane was of a technical grade containing at least 95 mol percent cyclohexane. The ethylene was obtained from the Matheson Company, Inc., Joliet, Illinois, and had a minimum purity of 99.5 weight percent.

The physical properties of a compression molded sample of this ethylene polymer were found to be as follows:

| | |
|---|---|
| Density, gms./cc. at room temperature | 0.972 |
| Melting point, °F. | 256±2 |
| Impact strength (by falling ball method) | >72" |
| Melt index | 0.082 |
| Molecular weight based on melt index | 61,200 |
| Color | Medium gray |

The polymers and copolymers produced in accordance with this invention have utility in applications where solid plastics are used. They can be used to impregnate paper and fabrics, and they can be molded to form articles of any desired shape, such as bottles and other containers for liquids. Also, they can be formed into pipe by extrusion.

As will be evident to those skilled in the art, many variations and modifications can be practiced within the scope of the disclosure and claims of this invention. The invention resides in an improved polymerization process for olefins as described herein comprising the use of a novel catalyst composition and the polymers so produced, said catalyst composition comprising (A) at least one titanium derivative selected from the group consisting of (1) compounds corresponding to the formula $X_nTi(OR)_m$, (2) compounds corresponding to the formula $$Ti_a[(OCH_2CH_2)_aNH_{(3-a)}]_b$$

(3) salts of monobasic acids and titanium, and (4) complex salts of dibasic organic acids and titanium and at least one member selected from the group consisting of alkali metals and ammonia, wherein X is a halogen, wherein R is selected from the group consisting of R'' and R''', where R'' is selected from the group consisting of saturated acyclic (alkyl), monoolefinic acyclic (alkenyl), saturated cyclic (cycloalkyl), monoolefinic cyclic (cycloalkenyl), aromatic (aryl), and combinations of two or more of these radicals, where R''' is selected from the group consisting of (a) R'' radicals which are halogen substituted, (b) R'' radicals which contain oxygen, and (c) R'' radicals which are halogen substituted and contain oxygen, said oxygen being present in the form of an ether linkage, wherein R contains from 1 to 20 carbon atoms and the compound contains up to a total of 50 carbon atoms, wherein $m$ and $n$ are whole numbers, with $m$ being at least 1 and not greater than the valence of the titanium and with the sum of $m$ and $n$ being equal to the valence of the titanium, and wherein $a$ is an integer from 1 to 3, inclusive, and $b$ is equal to the valence of the titanium; (B) at least one complex hydride corresponding to the formula $MM'H_x$, wherein M is an alkali metal, M' is a metal selected from the group consisting of aluminum, gallium, indium and thallium, and $x$ is equal to the sum of the valences of M and M'; and (C) at least one halide of aluminum.

We claim:

1. A method for polymerizing ethylene which comprises contacting ethylene with a catalyst consisting essentially of a mixture of titanium butoxide, lithium aluminum hydride and aluminum chloride, in the presence of a hydrocarbon diluent, inert and liquid under conditions of the method, at a temperature in the range from 100 to 350° F. and a pressure in the range from 100 to 1000 p.s.i.g., the ratio of the amount of said lithium aluminum hydride to said titanium butoxide being in the range of 0.05 to 50 mols of said hydride per mol of said butoxide and the ratio of the amount of said aluminum chloride to said titanium butoxide being in the range of 0.05 to 50 mols of said chloride per mol of said butoxide.

2. A catalyst composition consisting essentially of a mixture of titanium butoxide, lithium aluminum hydride and aluminum chloride, the ratio of the amount of said lithium aluminum hydride to said titanium butoxide being in the range of 0.05 to 50 mols of said hydride per mol of said butoxide and the ratio of the amount of said aluminum chloride to said titanium butoxide being in the range of 0.05 to 50 mols of said chloride per mol of said butoxide.

3. A catalyst composition consisting essentially of a mixture of titanium potassium oxalate, lithium aluminum hydride and aluminum chloride, the ratio of the amount of said lithium aluminum hydride to said titanium potassium oxalate being in the range of 0.05 to 50 mols of said hydride per mol of said oxalate and the ratio of the amount of said aluminum chloride to said titanium potassium oxalate being in the range of 0.05 to 50 mols of said chloride per mol of said oxalate, 4. A catalyst composition consisting essentially of a mixture of titanium butoxide, lithium aluminum hydride and aluminum bromide, the ratio of the amount of said lithium aluminum hydride to said titanium butoxide being in the range of 0.05 to 50 mols of said hydride per mol of said butoxide and the ratio of the amount of said aluminum bromide to said titanium butoxide being in the range of 0.05 to 50 mols of said bromide per mol of said butoxide.

5. A catalyst composition consisting essentially of a mixture of triethanolamine titanate, lithium aluminum hydride and aluminum chloride, the ratio of the amount of said lithium aluminum hydride to said triethanolamine titanate being in the range of 0.05 to 50 mols of said hydride per mol of said titanate and the ratio of the amount of said aluminum chloride to triethanolamine titanate being in the range of 0.05 to 50 mols of said chloride per mol of said titanate.

6. A catalyst composition consisting essentially of a mixture of titanium butoxide, lithium gallium hydride and aluminum chloride, the ratio of the amount of said lithium gallium hydride to said titanium butoxide being in the range of 0.05 to 50 mols of said hydride per mol of said butoxide and the ratio of the amount of said aluminum chloride to said titanium butoxide being in the range of 0.05 to 50 mols of said chloride per mol of said butoxide.

7. A method for polymerizing ethylene which comprises contacting said ethylene with a catalyst consisting essentially of a mixture of titanium butoxide, lithium aluminum hydride and aluminum chloride, said contacting occurring in the presence of a hydrocarbon diluent, inert and liquid under conditions of the method, and the ratio of the amount of said lithium aluminum hydride to said titanium butoxide being in the range of 0.05 to 50 mols of said hydride per mol of said butoxide and the ratio of the amount of said aluminum chloride to said titanium butoxide being in the range of 0.05 to 50 mols of said chloride per mol of said butoxide.

8. A method for polymerizing ethylene which comprises contacting said ethylene with a catalyst consisting essentially of a mixture of titanium potassium oxalate, lithium aluminum hydride and aluminum chloride, said contacting occurring in the presence of a hydrocarbon diluent, inert and liquid under conditions of the method, and the ratio of the amount of said lithium aluminum hydride to said titanium potassium oxalate being in the range of 0.05 to 50 mols of said hydride per mol of said oxalate and the ratio of the amount of said aluminum chloride to said titanium potassium oxalate being in the range of 0.05 to 50 mols of said chloride per mol of said oxalate.

9. A method for polymerizing ethylene which comprises contacting said ethylene with a catalyst consisting essentially of a mixture of titanium butoxide, lithium aluminum hydride and aluminum bromide, said contacting occurring in the presence of a hydrocarbon diluent, inert and liquid under conditions of the method, and the ratio of the amount of said lithium aluminum hydride to said titanium butoxide being in the range of 0.05 to 50 mols of said hydride per mol of said butoxide and the ratio of the amount of said aluminum bromide to said titanium butoxide being in the range of 0.05 to 50 mols of said bromide per mol of said butoxide.

10. A method for polymerizing ethylene which comprises contacting said ethylene with a catalyst consisting essentially of a mixture of titanium butoxide, lithium gallium hydride and aluminum chloride, said contacting occurring in the presence of a hydrocarbon diluent, inert and liquid under conditions of the method, and the ratio of the amount of said lithium gallium hydride to said titanium butoxide being in the range of 0.05 to 50 mols of said hydride per mol of said butoxide and the ratio of the amount of said aluminum chloride to said titanium butoxide being in the range of 0.05 to 50 mols of said chloride per mol of said butoxide.

11. A method for polymerizing ethylene which comprises contacting said ethylene with a catalyst consisting essentially of a mixture of triethanolamine titanate, lithium aluminum hydride and aluminum chloride, said contacting occurring in the presence of a hydrocarbon diluent, inert and liquid under conditions of the method, and the ratio of the amount of said lithium aluminum hydride to said triethanolamine titanate being in the range of 0.05 to 50 mols of said hydride per mol of said titanate and the ratio of the amount of said aluminum chloride to said triethanolamine titanate being in the range of 0.05 to 50 mols of said chloride per mol of said titanate.

12. A method for polymerizing an aliphatic 1-olefin having up to and including 8 carbon atoms per molecule which comprises contacting said olefin with a catalyst comprising (A) a titanium derivative selected from the group consisting of (1) compounds corresponding to the formula $Ti(OR)_m$, wherein R is an alkyl radical containing from 1 to 20 carbon atoms and the compound contains up to a total of 50 carbon atoms and wherein $m$ is equal to the valence of the titanium, (2) compounds corresponding to the formula $$Ti_a[(OCH_2CH_2)_aNH_{(3-a)}]_b$$

wherein $a$ is an integer from 1 to 3, inclusive, and $b$ is equal to the valence of the titanium, and (3) a compound selected from the group consisting of (a) a complex salt of malonic acid, titanium and an alkali metal, and (b) a complex salt of oxalic acid, titanium and an alkali metal, (B) a complex hydride corresponding to the formula $MM'H_x$, wherein M is an alkali metal, M' is a metal selected from the group consisting of aluminum and gallium, and $x$ is equal to the sum of the valences of M and M', and (C) a halide of aluminum, in the presence of a hydrocarbon diluent, inert and liquid under conditions of the method, the ratio of the amount of said complex hydride to said titanium derivatvie being in the range of 0.05 to 50 mols of complex hydride per mol of titanium derivative and the ratio of the amount of said aluminum halide to said titanium derivative being in the range of 0.05 to 50 mols of aluminum halide per mol of titanium derivative.

13. A method for polymerizing an aliphatic 1-olefin having up to and including 8 carbon atoms per molecule which comprises contacting said olefin with a catalyst comprising (A) a titanium derivative selected from the group consisting of (1) compounds corresponding to the formula $Ti(OR)_m$, wherein R is an alkyl radical containing from 1 to 20 carbon atoms and the compound contains up to a total of 50 carbon atoms and wherein $m$ is equal to the valence of the titanium, (2) compounds corresponding to the formula $Ti_a[(OCH_2CH_2)_aNH_{(3-a)}]_b$, wherein $a$ is an integer from 1 to 3, inclusive, and $b$ is equal to the valence of the titanium, and (3) a compound selected from the group consisting of (a) a complex salt of malonic acid, titanium and an alkali metal, and (b) a complex salt of oxalic acid, titanium and an alkali metal; (b) a complex hydride corresponding to the formula $MM'H_x$, wherein M is an alkali metal, M' is a metal selected from the group consisting of aluminum and gallium, and $x$ is equal to the sum of the valences of M and M', and (C) a halide of aluminum, at a temperature in the range from zero to 500° F., in the presence of a hydrocarbon diluent, inert and liquid under conditions of the method, and at a pressure sufficient to maintain said diluent in liquid phase, the ratio of the amounts of said complex hydride to said titanium derivative being in the range of 0.05 to 50 mols of complex hydride per mol of titanium derivative and the ratio of the amount of said aluminum halide to said titanium derivative being in the range of 0.05 to 50 mols of aluminum halide per mol of titanium derivative; and recovering the solid polymer so produced.

14. A catalyst composition comprising (A) a titanium derivative selected from the group consisting of (1) compounds corresponding to the formula $Ti(OR)_m$, wherein R is an alkyl radical containing from 1 to 20 carbon atoms and the compound contains up to a total of 50 carbon atoms and wherein $m$ is equal to the valence of the titanium, (2) compounds corresponding to the formula $Ti_a[(OCH_2CH_2)_aNH_{(3-a)}]_b$, wherein $a$ is an integer from 1 to 3, inclusive, and $b$ is equal to the valence of the titanium, and (3) a compound selected from the group consisting of (a) a complex salt of malonic acid, titanium and an alkali metal, and (b) a complex salt of oxalic acid, titanium and an alkali metal, (B) a complex hydride corresponding to the formula $MM'H_x$, wherein M is an alkali metal, M' is a metal selected from the group consisting of aluminum and gallium, and $x$ is equal to the sum of the valences of M and M', and (C) a halide of aluminum, the ratio of the amount of said complex hydride to said titanium derivative being in the range of 0.05 to 50 mols of complex hydride per mol of titanium derivative and the ratio of the amount of said aluminum halide to said titanium derivative being in the range of 0.05 to 50 mols of aluminum halide per mol of titanium derivative.

References Cited in the file of this patent

UNITED STATES PATENTS

| | | |
|---|---|---|
| 2,440,498 | Young | Apr. 27, 1948 |
| 2,474,670 | Hersberger | June 28, 1949 |
| 2,491,116 | Kraus | Dec. 13, 1949 |
| 2,634,260 | Carnahan | Apr. 7, 1953 |
| 2,721,189 | Anderson | Oct. 18, 1955 |
| 2,824,090 | Edwards et al. | Feb. 18, 1958 |

FOREIGN PATENTS

| | | |
|---|---|---|
| 874,215 | Germany | July 8, 1949 |
| 534,792 | Belgium | Jan. 31, 1955 |
| 781,837 | Great Britain | Aug. 28, 1957 |
| 785,314 | Great Britain | Oct. 23, 1957 |